United States Patent Office 3,499,901
Patented Mar. 10, 1970

3,499,901
PARTIALLY HYDROGENATED
PHENANTHRIDINES
Joseph Hellerbach, Basel, Switzerland, assignor to Hoffmann-La Roche Inc., Nutley, N.J., a corporation of New Jersey
No Drawing. Filed June 23, 1966, Ser. No. 559,739
Claims priority, application Switzerland, June 30, 1965, 9,168/65
Int. Cl. C07d 39/02
U.S. Cl. 260—286                                7 Claims

ABSTRACT OF THE DISCLOSURE 1,2,3,4,4a,10b - hexahydro- and 1,2,3,4,4a,5,6,10b-octahydrophenanthridines substituted in the 9-position with hydroxy lower alkoxy, hydroxy-substituted lower alkoxy or lower alkoxy-substituted lower alkoxy and whose 10b-carbon atom is quaternized with lower alkyl, lower cycloalkyl-alkyl or lower alkenyl, are described. The end products are useful as analgesic agents.

---

This invention is concerned with novel derivatives of phenanthridine and to processes and intermediates useful for their production. More particularly, this invention relates to pharmacologically-active hexahydro- and octahydrophenanthridines and to processes and intermediates for their production.

It is known that certain partially hydrogenated phenanthridines which are substituted in the 9-position with an oxy-group, by which term is meant a monovalent radical having its valence bond from an oxygen atom, such as hydroxy, alkoxy and the like, possess pharmacological, and more particularly, analgesic activity. It has been found by this invention that the pharmacological activity of these partially hydrogenated phenanthridine derivatives is considerably increased when there is a monovalent substituent on the 10b-position. This increase in activity is illustrated in Table I, wherein the analgesic activity, as determined by means of the writhing test, and the toxicity of the following substances in mice are set forth:

Compound A—9-methoxy - 1,2,3,4,4a,5,6,10b - octahydrophenanthridine hydrochloride.
Compound B—9-methoxy - 10b - methyl - 1,2,3,4,4a,5, 6,10b-octahydrophenanthridine hydrochloride.
Compound C—5-methyl - 9 - methoxy - 1,2,3,4,4a,5, 6,10b-octahydrophenanthridine hydrochloride.
Compound D—5,10b - dimethyl - 9 - methoxy - 1,2,3,4, 4a,5,6,10b-octahydrophenanthridine hydrochloride.

For the activity determination, the writhing test [method by E. Siegismund et al., Proc. Soc. Exp. Biol. Med. 95, 729–31 (1957), slightly modified] was employed.

The results obtained are set out in the following table:

| Substance | $DL_{50}$, mg./kg. | Dosage, mg./kg, s.c. | Percent writhing reduction |
|---|---|---|---|
| A | 15–30 i.v.[1] 125–250 s.c.[1] | 10 | 5 |
|   |   | 30 | 58 |
| B | 28 i.v., 46 s.c. | 2.5 | 66 |
|   |   | 5 | 100 |
| C | 15–30 i.v.[1] 60–120 s.c.[1] | 10 | 33 |
|   |   | 30 | 69 |
| D | 28 i.v., 60–120 s.c. | 5 | 69 |
|   |   | 10 | 100 |

[1] =24 hours toxicity

From the above data it becomes obvious that the increase in activity is not attended by a proportional rise in the toxicity, or, in other words, that the therapeutic index of a compound having a quaternary carbon atom in position 10b lies considerably more favourably than the therapeutic index of the corresponding compound which is not substituted at carbon atom 10b.

The present process is characterized in that, in the synthesis of 1,2,3,4,4a,10b-hexahydro- and 1,2,3,4,4a,5, 6,10b-octahydro-phenanthridine derivatives which are substituted in the 9-position with a hydroxy group a lower alkoxy group, a hydroxy-lower alkoxy group or a lower alkoxy-lower alkoxy group, the carbon atom 10b is made quaternary with a lower alkyl, a lower cycloalkylalkyl, or a lower alkenyl group.

The manufacture of such phenanthridine derivatives can, for example, be effected by subjecting a racemic or an optically active compound of the general formula

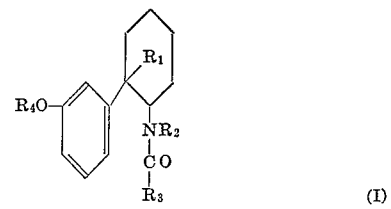

(I)

wherein $R_1$ represents a lower alkyl, a lower cycloalkylalkyl or a lower alkenyl group, $R_2$ is hydrogen, a lower alkyl group or a lower cycloalkylalkyl group, $R_3$ is hydrogen, a lower alkyl or cycloalkylalkyl group and $R_4$ represents a lower alkyl, hydroxyalkyl, alkoxyalkyl or the benzyl group, or a racemic or optically active compound of the formula

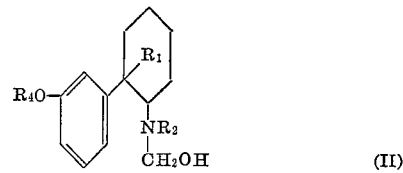

(II)

wherein $R_1$, $R_2$ and $R_4$ have the above meaning, to cyclisation, by hydrogenating, if desired, a 1,2,3,4,4a,10b-hexahydrophenanthridine compound so obtained to the corresponding 1,2,3,4,4a,5,6,10b - octahydrophenanthridine compound, by converting any benzyloxy group $R_4O$ into the hydroxy group, by converting, if desired, any alkoxy group present in the aromatic nucleus into the hydroxy group, by substituting, if desired, an octahydrophenanthridine compound so obtained at the nitrogen with a lower alkyl or cycloalkylalkyl group, and by converting, if desired, a hexa- or octahydrophenanthridine compound thus obtained into a salt and/or, in the case of a racemate, resolving such racemate into the optical antipodes.

The cyclisation of a compound of the above Formula I can be carried out according to methods known per se. Phosphorus oxychloride, phosphorus pentoxide or a polyphosphoric acid are preferably used as the cyclisation agent.

In the cyclisation of a compound of the above Formula I, there is first of all obtained a 1,2,3,4,4a,10b-hexahydrophenanthridine compound of the formula

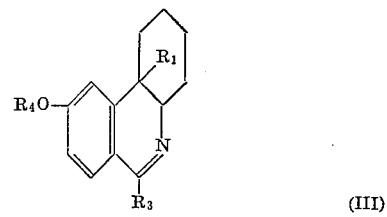

(III)

A benzyloxy group $R_4O$ which may be present in a compound of Formula III is then converted into the hydroxy group. Furthermore, an alkoxy group $R_4$ can, if desired, be converted into the hydroxy group by conventional methods.

A racemate of Formula III can be resolved into the optical antipodes in a manner known per se.

Finally, the bases of Formula III can be converted into quaternary salts by conventional methods.

By cyclisation of a compound of Formula I and, if required, subsequent operations, there can thus be obtained racemic and optically active hexahydrophenanthridine derivatives of the formula

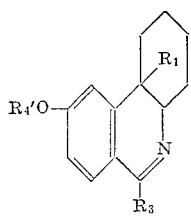

(IIIa)

wherein $R_1$ and $R_3$ have the significance given above and $R_4'$ represents hydrogen, a lower alkyl, hydroxyalkyl or alkoxyalkyl group, and quaternary salts of these compounds.

The 1,2,3,4,4a,10b-hexahydrophenanthridines of Formula IIIa thus obtained can in a further process step be hydrogenated to the corresponding octahydrophenanthridines, there being obtained compounds in which the nitrogen atom of the heterocyclic ring is unsubstituted.

The hydrogenation can be carried out according to methods known per se; for example, catalytically using a palladium, platinum or Raney-nickel catalyst, or by means of sodium borohydride or lithium aluminum hydride.

The octahydrophenanthridines can, where desired, be substituted at the nitrogen with a lower alkyl or cycloalkylalkyl group in a manner known per se.

Also, an alkoxy group contained in the aromatic ring of an octahydrophenanthridine compound thus obtained can be converted into the hydroxy group in a manner known per se, where desired.

Moreover, a racemate thus obtained can be resolved into the optical antipodes in a manner known per se.

Finally, the octahydrophenanthridine bases obtained can be converted into acid addition salts.

By cyclisation of compounds of Formula I, and hydrogenation of the cyclisation product, and, if required, by subsequent operations, there can thus be obtained racemic or optically active octahydrophenanthridine derivatives of the formula

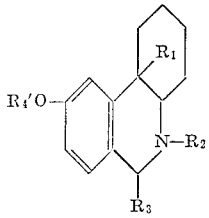

(IV)

wherein $R_1$, $R_2$, $R_3$ and $R_4'$ have the meaning given above, and salts of these compounds.

By cyclisation of compounds of the above Formula II and, if required, subsequent conversion of an alkoxy or benzyloxy group contained in the aromatic ring of the cyclisation product into the hydroxy group, one proceeds directly to the octahydrophenanthridine compounds of the Formula IV wherein $R_3$ represents hydrogen.

Naturally, octahydrophenanthridines obtained in this manner can also be subjected to the above named subsequent operations (substitution at the nitrogen, resolution of a racemate into the optical antipodes and salt formation).

The cyclisation of compounds of Formula II can be carried out in a simple manner by means of an acidic agent. As the acidic agent there can be used the usual mineral acids or organic acids. Hydrochloric acid is preferably used as the acidic agent. On carrying out the cyclisation with an acidic agent other than formic acid, the significance of the symbol $R_2$ is not altered, i.e. $R_2$ has the same significance in the cyclisation product as in the starting material of Formula II. On the other hand, when the cyclisation is carried out by means of formic acid and where a starting material of Formula II is used in which $R_2$ signifies hydrogen, there is obtained a cyclisation product of Formula IV in which $R_2$ signifies the methyl group.

If the cyclisation is carried out in the absence of an acid agent, it is possible to isolate bis-compounds of the general formula

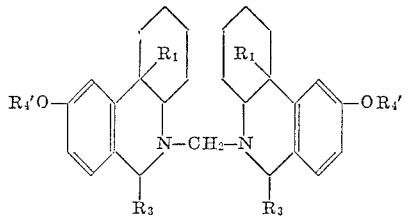

(IVa)

wherein $R_1$, $R_3$ and $R_4'$ have the above meaning.

These bis-compounds are thus obtained by reacting an amine of the Formula V given below with formaldehyde, the reaction product not being treated with an acid agent. Treatment of the bis-compounds of Formula IVa will result in the cleavage thereof.

The compounds of the present invention can thus be represented by the general formula

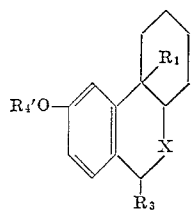

(IVb)

wherein X represents the grouping

or the grouping

$R_2'$ being hydrogen, a lower alkyl or cycloalkylalkyl group or a group of the formula

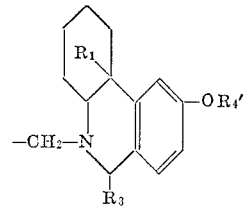

Within the scope of the present invention there are also included compounds of Formula IVb, wherein the substituent in position 9 is $R_4O$ instead of $R_4'O$.

The terms "lower alkyl" and "lower cycloalkylalkyl" used in the definition of symbols $R_1, R_2, R_3, R_4$ and $R_4'$ relates to groups containing up to seven carbon atoms such as methyl, ethyl, propyl, isopropyl, butyl; cyclopropyl-methyl, cyclobutylmethyl, cyclopentylmethyl, cyclopropylethyl, cyclobutylethyl and the like.

The term "lower alkenyl" refers to alkenyl groups having up to four carbon atoms, particularly to allyl.

The terms "lower hydroxyalkyl" and "lower alkoxyalkyl" refer to such groups the alkyl and/or alkoxy portion of which contains up to four carbon atoms, e.g. hydroxymethyl, hydroxyethyl, hydroxypropyl; methoxymethyl, methoxyethyl, methoxypropyl, ethoxymethyl, ethoxyethyl, ethoxypropyl and the like.

The use of a starting material of Formula I or II wherein $R_1$ and $R_4$ each represent a methyl group and $R_2$ and $R_3$ each represent a hydrogen atom is especially preferred. When using such starting material, 9-methoxy- 10b-methyl-1,2,3,4,4a,5,6,10b-octahydro - phenanthridine or salts thereof are obtained. This base and its salts, especially the antipodes levorating polarised light in methanolic solution, are distinguished by especially advantageous analgesic action.

The starting materials of Formulae I and II used according to one of the two process variants above can be manufactured in a manner known per se from the corresponding amines of the formula

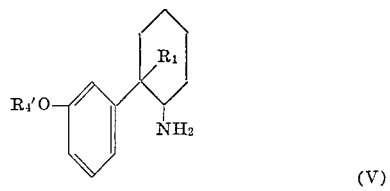

(V)

For the manufacture of the starting materials of Formula I, for example, a corresponding amine of Formula V can be reacted with an acid chloride of the formula

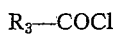

$R_3$—COCl or with a corresponding acid anhydride.

The starting materials of Formula II can be obtained by reaction of a corresponding amine of Formula V with formaldehyde.

The amines of Formula V can be obtained by using a compound of the formula

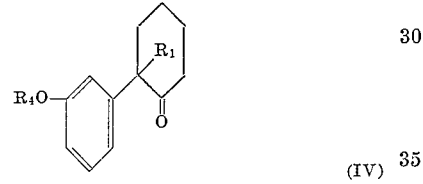

(IV)

as starting material and by converting this compound into a compound of Formula V in a manner known per se. A compound thus obtained can thereupon be transformed into a salt if desired and/or in the case of a racemate, split into the optical antipodes. Moreover, an alkoxy group $R_4O$ can be converted into the hydroxy group.

The conversion of a compound of Formula VI into a compound of Formula V can be effected by reaction of the respective compound of Formula VI with hydroxylamine and subsequent reduction of the oxime of the formula

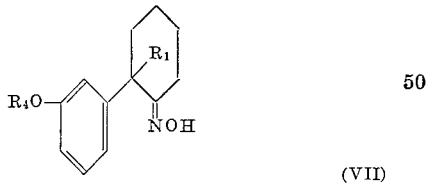

(VII)

thus obtained to the corresponding amine of Formula V. The reduction of the oxime of Formula VII is conveniently effected catalytically using a Raney-nickel or palladium catalyst or by means of lithium aluminum hydride.

Alternatively, the amines of Formula V can be obtained by reaction of the corresponding ketones of Formula VI with ammonia and reduction of the imino compounds. This reduction is conveniently carried out catalytically using a platinum or palladium catalyst or by means of sodium borohydride.

The manufacture of ketones of Formula VI is described below by way of an example, viz. the manufacture of 2-methyl-2-(3'-methoxy-phenyl)-cyclohexanone:

m-Methoxy-β-nitro-styrene is reacted with 1,3-butadiene to give 4-(3'-methoxy-phenyl)-5-nitro-cyclohexene. This compound is reacted with sodium alcoholate, there being formed 2-(3'-methoxy - phenyl) - cyclohexenone which is hydrogenated to 2-(3'-methoxy-phenyl)-cyclohexanone using a palladium/carbon catalyst. This hexanone compound is reacted with methyl iodide, whereby 2-methyl-2-(3'-methoxy - phenyl - cyclohexanone is obtained. The other ketones of Formula VI can be obtained in an analogous manner.

Thus, the manufacture of the hexahydro- and octahydro-phenanthridines and of the cyclohexane intermediates of the present invention can be represented by the following general reaction scheme:

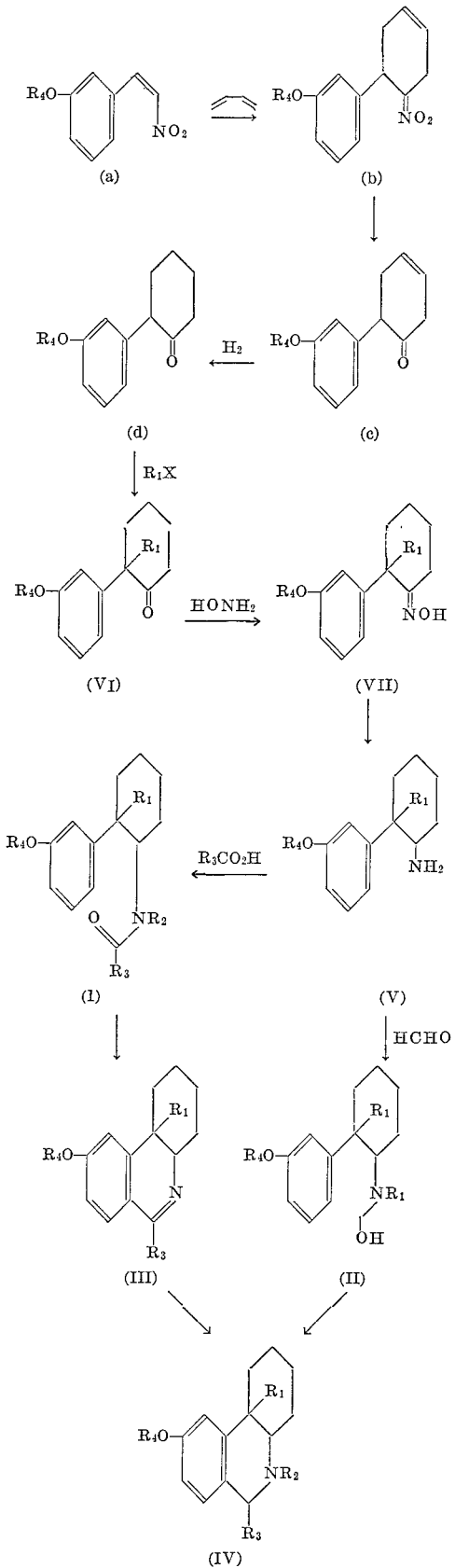

The first step in the above-illustrated scheme comprises the Diels-Alder addition of butadiene to a β-nitrostyrene (a) having an oxy-containing radical $R_4O$ on the 3-position. Preferred oxy-containing radicals are the lower alkoxy radicals. Illustrative examples of these β-nitrostyrenes include 3-methoxy-β-nitrostyrene, 3-ethoxy-nitrostyrene, and the like. These β-nitrostyrenes are obtained from the corresponding benzaldehydes by reaction with nitromethane in known manner.

The conditions of the Diels-Alder reaction are not narrowly critical, although elevated temperatures, especially from about 100° C. to about 175° C., and elevated pressures, particularly up to about 50 atmospheres, are normally employed. In addition, it is preferred that the reaction be conducted in a non-oxidizing atmosphere, e.g., under a nitrogen or an argon atmosphere, and/or in the presence of an anti-oxidant such as hydroquinone. If desired, this reaction may be conducted in the presence of an inert reaction solvent, such as an aromatic or an aliphatic hydrocarbon, including benzene, hexane and the like; a chlorinated hydrocarbon such as carbon tetrachloride, chlorobenzene and the like; or an ether such as diethyl ether, tetrahydrofuran and the like; or an ether such as diethyl ether, tetrahydrofuran and the like.

In the second step of the process of this invention the 4-phenyl-5-nitrocyclohexene (b) product of the Diels-Alder reaction is converted to cyclohexenone (c) by reaction with an alkali metal lower alkoxide. By the term "alkali metal" is meant a Group I metal having an atomic number of from 3 to 19, inclusive (lithium, potassium and sodium) with sodium being preferred. The temperature of this reaction is not narrowly critical, but temperatures below about room temperature (about 20° to 25° C.) are preferred, with temperatures below about 0° C. being especially preferred. It is generally preferred to effect this reaction under an inert, e.g., nitrogen, atmosphere. Solvents such as hydrocarbons, ethers and the like may be employed, if desired, but excess alcohol employed in forming the alkali metal lower alkoxide reagent is generally suitable as the reaction solvent.

The third step of the foregoing synthesis comprises the catalytic hydrogenation of the cyclohexenone (c) to its corresponding cyclohexanone (d). This catalytic hydrogenation is conducted in the presence of any suitable catalyst such as the noble metals, including platinum, palladium, rhodium and the like, as well as Raney nickel and other known catalysts. These catalysts may be employed alone or on a suitable support, such as carbon, alumina and the like. The hydrogenation is conducted under relatively mild conditions, although temperatures somewhat above room temperature and up to about 100° C. are generally preferred. The reaction may be effected in any inert reaction medium including hydrocarbons, alcohols, ethers and the like.

The fourth step of the reaction sequence comprises reacting the cyclohexanone (d) with a compound having the formula $R_1X$ wherein $R_1$ is as defined above; and X is a halogen atom, especially one having an atomic number of 17 to 53 inclusive (i.e. chlorine, bromine and iodine). Illustrative examples of these compounds include methyl iodide, ethyl bromide, propyl chloride, allyl bromide, benzyl chloride, cyclopropylmethyl bromide and the like.

The reaction with the $R_1X$ compound is effected by first reacting the cyclo hexanone compound (d) with a strong base, i.e., an alkali metal hydride, an alkali metal amide or an alkali metal alkoxide such as sodium hydride, sodamide or potassium tert.-butoxide. This preliminary reaction is effected at elevated temperatures, especially in the range of from about 50° C. to about 100° C., and under an inert atmosphere. On completion of this reaction there is added the $R_1X$ compound at an elevated temperature, especially in the range of from about 30° C. to about 75° C., thereby forming the 2-$R_1$-2-phenylcyclohexanone (VI).

Cyclohexanone (VI) is converted to its oxime (VII) in known manner by reaction with hydroxylamine. This reaction may be effected at slightly elevated temperatures, for example, about 30° C. to about 75° C., in aqueous or alcoholic media.

Oxime (VII) is then converted to amine (V) by either catalytic hydrogenation, such as is discussed above in reference to the production of cyclohexanone (VI), or by chemical reduction with known reagents. When $R_1$ is an alkenyl group, the use of a chemical reducing agent, for example lithium aluminum hydride or sodium borohydride, is preferred to avoid the conversion of the alkenyl group to the corresponding alkyl group.

The phenanthridines of Formula IV are produced from the amines (V) by one of two routes. The first route comprises the base-catalyzed acylation of amine (V) to produce acylamide (I), followed by an acid-catalyzed cyclization to hexahydrophenanthridine (III) and then reduction to octahydrophenanthridine (IV). The acylation is effected by the base-catalyzed reaction of an acid of the formula $R_3CO_2H$, wherein $R_3$ is defined as above, or the acid chloride or acid anhydride thereof, with amine (V).

The reaction conditions are not narrowly critical, but temperatures in the range of about 50° C. to about 200° C. are normally employed. As catalysts one can employ organic bases such as pyridine and inorganic bases such as potassium carbonate and the like. Illustrative examples of the acylation reagents include the following acids, as well as their acid chlorides or acid anhydrides; formic acid, acetic acid, propionic acid, butyric acid, pivalic acid and the like.

Cyclization of the amide (I) is effected in the presence of either an organic or an inorganic acid as a catalyst. Preferred as catalysts are acidic phosphorus compounds such as phosphorus oxychloride, phosphorus pentoxide and polyphosphoric acid. This reaction is effected at elevated temperatures, preferably in the range of from about 50° C. to about 100° C.

The conversion of hexahydrophenanthridine (III) to octahydrophenanthridine (IV) is effected in known manner, for example by catalytic hydrogenation as discussed above in reference to the production of (d), or by chemical reduction as discussed above regarding the production of amine (V).

The alternate method of producing an octahydrophenanthridine (IV) from an amine (V) comprises reacting the amine with formaldehyde to produce hydroxymethylamine compound (II), which upon treatment with acid cyclizes to form octahydrophenanthridine (IV). The conditions for the reaction with formaldehyde are not narrowly critical, although ambient conditions are normally employed. The acid employed in effecting cyclization can be either organic or inorganic, and is preferably a mineral acid such as hydrochloric acid. Although the significance of $R_2$ is normally unchanged in this reaction, it has been found that when $R_2$ of compound (II) is hydrogen and the acid is formic acid, there is obtained an octahydrophenanthridine of Formula IV wherein $R_2$ is methyl.

It should be noted that the foregoing reaction sequence merely defines the transformations necessary to obtain a phenanthridine from a β-nitrostyrene precursor. As will be obvious to any chemist skilled in the art, many additional transformations may be effected to introduce or otherwise alter substituent groups. For example, compounds wherein $R_4$ is alkyl may be converted to the corresponding compound wherein $R_4$ is hydrogen. Also, a benzyloxy group $R_4O$ may be converted into the hydroxy group. In addition N-alkylation or N-dealkylation of any of the compounds I, II, IV and V may be effected if desired. Alternatively, an N-unsubstituted octahydrophenanthridine can be reacted with an acyl chloride to produce an amide, the carbonyl of which can be reduced to methylene by treatment with lithium aluminum hydride. Still other means of varying, adding or removing substituents will be apparent to those skilled in the art.

The phenanthridine derivatives of the present invention possess, as has already been mentioned, an analgesic action. Moreover, such compounds were found to have an antitussive, anti-inflammatory and antipyretic action.

It has been established that upon resolution of a racemic product into its optical antipodes there occurs a disproportionation of the degree of activity. For example, it has been found that the 9-methoxy-10b-methyl-1,2,3,4,4a,5,6,10b-octahydrophenanthridine which is levorotatory in methanolic solution exhibits a significantly higher activity than either the corresponding dextrorotatory antipode or the racemic mixture.

The resolution may be effected at any convenient stage in the foregoing synthesis. For example, one may react racemic amine of Formula V with an optically active acid, such as D-tartaric acid, to form diastereomeric salts. These salts are then separated in known manner and then converted into the optically active free bases. The amines may then be employed to produce the optically active octahydrophenanthridine compounds IV, with the (+)-amine yielding the (−)-octahydrophenanthridine and (−)-amine yielding the (+)-octahydrophenanthridine.

From the foregoing it will become obvious that the intermediates in the manufacture of the phenanthridine derivatives of Formulas III, IV, IVa and IVb can be represented by the general formula

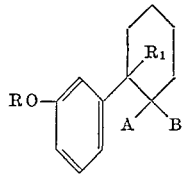

Wherein R is a member selected from the group consisting of hydrogen, lower alkyl, hydroxy-substituted lower alkyl, lower alkoxy-substituted lower alkyl and benzyl; $R_1$ is a member selected from the group consisting of lower alkyl, lower cycloalkylalkyl and lower alkenyl; A, when taken alone, is hydrogen; B, when taken alone, is amine, the —$NR_2COR_3$ radical or the —$NR_2CH_2OH$ radical, wherein $R_2$ and $R_3$ are as defined above; and A and B, when taken together, are oxo or isonitroso or imino.

A sub-group of the compounds of Formula VIII are the cyclohexyl amines of the general formula

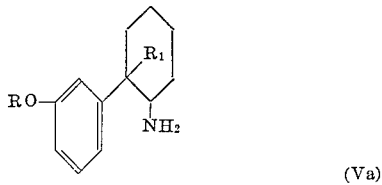

(Va)

wherein R is a member selected from the group consisting of hydrogen, lower alkyl, hydroxy-substituted lower alkyl, lower alkoxy-substituted lower alkyl and benzyl; and $R_1$ is a member selected from the group consisting of lower alkyl, lower cycloalkylalkyl and lower alkenyl.

The cyclohexyl amines of the above general Formula Va also have pharmacological activities, especially stimulating and anti-inflammatory activities.

By virtue of their pharmacological activities, both the phenanthridine compounds of Formula IVb and the amines of Formula Va find use as medicaments. Thus, they may be employed in the form of pharmaceutical preparations which contain them or their salts in admixture with a pharmaceutical, organic or inorganic inert carrier material suitable for enteral or parenteral application, such as, for example, water, gelatin, lactose, starch, magnesium stearate, talc, vegetable oils, gums, polyalkyleneglycols, petroleum jelly, etc. The pharmaceutical preparations can be submitted in solid form (e.g. as tablets, dragées, suppositories, capsules) or in liquid form (e.g. as solutions, suspensions or emulsions). They may be sterilized and/or contain additives such as preserving, stabilizing, wetting or emulsifying agents, salts for varying the osmotic pressure or buffers. Finally, they can be present as the sole active component, or they may be combined with one or more additional therapeutically valuable materials.

Suitable salts of these pharmaceutically-active components are their addition salts with pharmaceutically-acceptable acids. Suitable acids include inorganic acids such as hydrochloric acid, hydrobromic acid, phosphoric acid, sulfuric acid and the like, and organic acids such as maleic acid, ascorbic acid, tartaric acid and the like. The hydrohalide salts, especially the hydrochloride and the hydrobromide salts, are preferred.

The following examples are illustrative.

EXAMPLE 1

14.5 g. of 2-methyl-2-(3'-methoxy-phenyl)-cyclohexylamine are dissolved in 73 ml. of methanol, whereupon 18 ml. of a 38% aqueous formaldehyde solution are added and the reaction mixture is allowed to stand for 14 hours. The residue obtained after evaporation under reduced pressure is dissolved in alcohol and the solution is acidified with alcoholic hydrochloric using congo red as indicator. On concentration under reduced pressure, there is obtained 9-methoxy-10b-methyl-1,2,3,4,4a,5,6,10b-octahydro-phenanthridine hydrochloride which melts at 219–220° C. after recrystallization from a mixture of alcohol and ether.

The 2-methyl-2-(3'-methoxy-phenyl)-cyclohexylamine used as starting material in the above process is manufactured as follows:

13 g. or 2-methyl-2-(3'-methoxy-phenyl)-cyclohexanone oxime are dissolved in 150 ml. of methanol, whereupon there is added to the solution a solution of 3 g. of potassium hydroxide in 5 ml. of water. The mixture is then hydrogenated at about 40° C. in the presence of 20 g. of Raney-nickel. The hydrogen uptake proceeds very rapidly. After separation of the catalyst and evaporation of the methanol under reduced pressure, the residue is taken up in ether and the ethereal solution washed with water and evaporated to dryness. The residue is purified via 2-methyl-2-(3'-methoxy-phenyl)-cyclohexylamine hydrochloride which crystallizes spontaneously from ethanol and melts at 245–246° C. Treatment of this salt with an alkaline agent yields the free base.

The 2-methyl - 2 -(3'- methoxy-phenyl)-cyclohexanone oxime used as starting material can be obtained as follows:

150 g. of m-methoxy-β-nitro-styrene, together with a solution of 150 g. of 1,3-butadiene in 1500 ml. of chloroform and 750 ml. of hydroquinone, are heated at 140° C. under a pressure of 20 atmospheres for 24 hours in an autoclave in a nitrogen atmosphere. The reaction product is filtered and the clear filtrate is evaporated to dryness under reduced pressure. The evaporation residue is taken up in ether and the ethereal solution is successively washed with dilute aqueous sodium hydroxide, hydrochloric acid and water. After drying over sodium sulfate and evaporation of the ether, the residue obtained is recrystallized from a mixture of isopropyl ether and low-boiling petroleum ether, there being obtained 4-(3'-methoxy-phenyl)-5-nitro-cyclohexene-(1) which melts at 74–75° C.

An ethanolic sodium ethylate solution which has been prepared from 51 g. of sodium and 1200 ml. of absolute ethanol is added dropwise in a nitrogen atmosphere to a solution of 282 g. of 4-(3'-methoxy-phenyl)-5-nitro-cyclohexene-(1) in 1500 ml. of anhydrous ethanol. On addition of the sodium ethylate solution, there separates a thick paste which is thoroughly stirred for 15 hours. The reaction mixture is then slowly added under nitrogen to a mixture of 15 kg. of ice, 12 litres of ethanol and 1500 ml. of hydrochloric acid cooled to −5° C., whilst vigorously stirring. After further stirring at 0° C. for an hour and during the rise of the temperature of the reaction mixture to room temperature, the reaction mixture is diluted with water and extracted with methylene chloride. The methylene chloride extract is dried and evaporated under reduced pressure. The evaporation residue is taken up in methanol and hydrogenated at about 40° C. in the presence of 50 g. of a palladium-on-carbon catalyst. After uptake of the calculated quantity of hydrogen, the catalyst is filtered off and the filtrate freed from methanol by evaporation. The residue is distilled in high vacuum, 2-(3'-methoxy-phenyl)-cyclohexanone being obtained; $B.P._{0.1}=125-130°$ C.

11.6 g. of a 50% suspension of sodium amide in benzene are introduced in a nitrogen atmosphere into 100 ml. of anhydrous benzene. 30.6 g. of the 2-(3'-methoxy-phenyl)-cyclohexanone obtained as specified above in 100 ml. of absolute benzene are then added and the reaction mixture is boiled at reflux for 5 hours. After cooling, the reaction mixture is treated with 40 g. of methyl iodide and heated at 50° C. for 15 hours. After slow addition of water, the benzene solution is successively washed with dilute aqueous sodium hydroxide, water, hydrochloric acid and once more with water. After evaporation of the benzene, the residue is distilled in high vacuum, 2-methyl-2-(3'-methoxy-phenyl)-cyclohexanone ($B.P._{0.1}=116-117°$ C.) being obtained.

A mixture of 11 g. of 2-methyl-2-(3'-methoxy-phenyl)-cyclohexanone, 15 ml. of ethanol, 6 g. of hydroxylamine hydrochloride, 7 g. of sodium acetate and 14 ml. of water is heated at 40° C. for 30 minutes. There separates an oily substance which slowly solidifies. By recrystallization of this substance from aqueous ethanol, there is obtained 2-methyl-2-(3'-methoxy-phenyl)-cyclohexanone oxime of melting point 89–90°.

EXAMPLE 2

19.5 g. of 2-methyl-2-(3'-methoxy-phenyl)-cyclohexylamine are dissolved in 7.1 g. of anhydrous pyridine and the solution obtained is treated dropwise with 18.4 g. of acetic anhydride, the temperature of the reaction mixture rising to about 80° C. The reaction mixture is then heated at 100° C. for 2 hours and subsequently evaporated under reduced pressure. The evaporation residue is taken up in ether and the ethereal solution is successively washed with dilute hydrochloric acid, water, dilute aqueous sodium carbonate solution and once more with water. After evaporation of the ether, there remains an oily residue which consists of crude 1-acetamido - 2 - methyl - 2 - (3'-methoxy-phenyl)-cyclohexane.

This residue is treated in 150 ml. of anhydrous benzene with 18.2 g. of phosphorus oxychloride and boiled at reflux for 2 hours. The reaction mixture is then concentrated under reduced pressure and the residue extracted with ether and water. The aqueous extract is made alkaline, under ice-cooling, with caustic soda and the 6,10b-dimethyl - 9 - methoxy - 1,2,3,4,4a,10b - hexahydrophenanthridine which hereby precipitates is taken up in ether. After evaporation of the ether, there remain 20 g. of the crude hexahydrophenanthridine compound.

The 6,10b - dimethyl - 9 - methoxy - 1,2,3,4,4a,10b-hexahydrophenanthridine thus obtained is dissolved in 100 ml. of methanol, whereupon the solution obtained is treated portionwise at room temperature with 9.6 g. of sodium borohydride and allowed to stand overnight. The 6,10b - dimethyl - 9 - methoxy - 1,2,3,4,4a,5,6,10b - octahydro-phenanthridine which precipitates an addition of water is taken up in ether and washed with water. The hydrochloride of this base melts at 281–282° C.

An isomeric hydrochloride of melting point 255–256° C. can be isolated from the mother liquors.

EXAMPLE 3

2 g. of 9-methoxy-10b-methyl-1,2,3,4,4a,5,6,10b-octahydro-phenanthridine (obtained from the hydrochloride produced in accordance with Example 1) are heated at reflux for 4 hours with 60 ml. of hydrobromic acid. The reaction mixture is evaporated under reduced pressure, the residue treated with dilute aqueous sodium hydroxide, extracted with ether and washed several times with dilute aqueous sodium hydroxide and finally with water. After evaporation of the ether, there is obtained 9-hydroxy-10b-methyl - 1,2,3,4,4a,5,6,10b - octahydro - phenanthridine, the hydrochloride of which melts at 297–298° C.

EXAMPLE 4

6,10b - dimethyl - 9 - hydroxy - octahydro - phenanthridine, the hydrochloride of which melts at 302–303° C. is obtained from 6,10b-dimethyl-9-methoxy-octahydrophenanthridine in a manner analogous to that described in Example 3.

EXAMPLE 5

A mixture of 6.5 g. of 9-methoxy-10b-methyl-1,2,3,4,4a,5,6,10b-octahydro-phenanthridine, 25 ml. of formaldehyde (38% aqueous solution) and 25 ml. of formic acid (100%) is heated at reflux for 2 hours. The reaction mixture is then concentrated under reduced pressure, the residue is treated with dilute aqueous sodium hydroxide, taken up in a mixture of methylene chloride and ether and washed with water. After evaporation of the ether, there is obtained 5,10b-dimethyl-9-methoxy-1,2,3,4,4a,5,6,10 - octahydro - phenanthridine. The hydrochloride of this base melts at 221–222° C.

EXAMPLE 6

12 g. of (+)-2-methyl-2-(3'-methoxy-phenyl)-cyclohexylamine are treated with 20 ml. of methanol and 6 ml. of a 38% aqueous formaldehyde solution, whereupon the reaction mixture is allowed to stand at room temperature overnight. The mixture is then concentrated under reduced pressure, the remaining water is azeotropically distilled off after the addition of ethanol, the residue is treated with alcoholic hydrochloric acid and concentrated to dryness. The residue is crystallized from a mixture of alcohol and ether, (−)-9-methoxy-10b-methyl-1,2,3,4,4a,5,6,10b-octahydro-phenanthridine hydrochloride being obtained. M.P.=219–220° C.; $[\alpha]_D^{25}=-24.92°$ (c.=1.2 in methanol). Chromatography of the mother liquors yields the isomeric (−)-9-methoxy-109b-methyl-octahydro-phenanthridine hydrochloride, the hydrogen atom in position 4a of which is in axial position (M.P.=268–269° C.) and the (−)-5,10b-dimethyl-9-methoxy-1,2,3,4,4a,5,6,10b - octahydro-phenanthridine hydrochloride (M.P.=240–241° C.).

In an analogous manner, starting from (−)-2-methyl-2-(3'-methoxy-phenyl)-cyclohexylamine there is obtained (+) - 9 - methoxy - 10b - methyl - 1,2,3,4,4a,5,6,10b-octahydro-phenanthridine hydrochloride; M.P.=216–217° C.; $[\alpha]_D^{25}=+21.14°$ (c.=1.01 in methanol).

The optical antipodes of 2 - methyl - 2 - (3' - methoxy-phenyl)-cyclohexylamine can be obtained as follows:

A solution of 4.4 g. of racemic 2 - methyl - 2 - (3'-methoxy-phenyl)-cyclohexylamine (obtained according to Example 1) in 80 ml. of ethanol is treated with a solution of 3 g. of D-tartaric acid in 20 ml. of alcohol. From the mixture there crystallizes (+) - 2 - methyl - 2 - (3'-methoxy-phenyl)-cyclohexylamine tartrate (the tartrate dextrorotatory in methanolic solution); melting point 173–175° C., $[\alpha]_D^{25}=+46.1°$ (c.=1.26 in methanol). The salt obtained after recrystallization from ethanol melts at 184° C.; $[\alpha]_D^{25}=+59.1°$ (c.=1.22 in methanol).

On concentration of the mother liquors, there crystallizes the (−) - antipode; M.P.=120–130°, $[\alpha]_D^{21}=-24.8°$ (c.=1.39 in methanol).

EXAMPLE 7

1 - hydroxymethylamino - 2 - allyl - 2 - (3' - methoxyphenyl) - cyclohexane [obtained from 2 - allyl - 2 - (3'-methoxy-phenyl)-cyclohexylamine and formaldehyde in analogy to Example 1] is cyclised to 9-methoxy-10b-allyl-1,2,3,4,4a,5,6,10b-octahydro-phenanthridine in a manner analogous to that described in Example 1. The hydrochloride of the resulting base melts at 214–215° C.

The 2 - allyl - 2 - (3' - methoxy-phenyl)-cyclohexyl amine can be obtained as follows:

21 g. of lithium aluminum hydride are suspended in a mixture of 100 ml. of anhydrous ether and 200 ml. of anhydrous tetrahydrofuran, whereupon the suspension obtained is treated dropwise with a solution of 39 g. of 2-allyl-2-(3' - methoxy - phenyl) - cyclohexanone oxime in 150 ml. of anhydrous tetrahydrofuran. After boiling at reflux for 24 hours, addition of ether and decomposition of the excess lithium aluminum hydride with water, the inorganic salts are separated by filtration. The filtrate is then evaporated under reduced pressure and the residue distilled in high vacuum, 2-allyl-2-(3'-methoxy-phenyl)-cyclohexyl amine distilling over at 120–122° C. at a pressure of 0.01 mm. The hydrochloride of this base melts at 210–211° C.

The 2 - allyl - 2 - (3'-methoxy-phenyl)-cyclothexanone oxime used as starting material can be obtained as follows:

3-methoxy-phenyl-cyclohexanone is reacted with allyl bromide in the presence of sodium amide to give 2-allyl-2-(3'-methoxy-phenyl) - cyclohexanone; $B.P._{0.005}=109°$ C. This compound is reacted with hydroxyl amine to give 2 - allyl - 2-(3'-methoxy-phenyl)-cyclohexanone oxime; M.P.=103–104° C.

EXAMPLE 8

1 - hydroxymethylamino - 2 - propyl - 2 - (3' - methoxyphenyl)-cyclohexane [obtained from 2-propyl-2-(3'-methoxy-phenyl)-cyclohexyl amine and formaldehyde in analogy to Example 1] is cyclised to 9-methoxy-10b-propyl-1,2,3,4,4a,5,6,10b-octahydra - phenanthridine, the hydrochloride of which melts at 239–240° C.

The 2-propyl-2-(3'-methoxy-phenyl)-cyclohexyl amine used herein as starting material can be obtained as follows:

52 g. of 2-allyl-2-(3'-methoxy-phenyl)-cyclohexanone oxime are hydrogenated in methanol in the presence of Raney-nickel and a solution of 11.2 g. of potassium hydroxide in 11 ml. of water. After the uptake of the calculated quantity of hydrogen the catalyst is separated by filtration and the filtrate evaporated under reduced pressure. The residue is taken up in ether and the ethereal solution is washed neutral with water. The oily residue remaining after evaporation of the ether is treated with alcoholic hydrochloric acid. There is obtained 2-propyl-2-(3'-methoxy-phenyl) - cyclohexyl amine hydrochloride having a melting point of 239–240° C. Treatment of this salt with an alkaline agent yields the free base.

EXAMPLE 9

11 g. of 2-methyl-2,(3' - methoxy - phenyl)-cyclohexyl amine are heated at 170° C. for 5 hours with 11.5 g. of formic acid (99%). The reaction mixture is then concentrated under reduced pressure. The residue obtained is heated at reflux for 3 hours together with 9 g. of phosphorus oxychloride in 100 ml. of anhydrous benzene. The reaction mixture is then concentrated under reduced pressure and the residue is dissolved in ether and water. After separation of the aqueous portion, the latter is made alkaline and the substance which thereby precipitates is taken up in ether and washed with water. After evaporation of the ether, there is obtained 9-methoxy-10b-methyl - 1,2,3,4,4a,10b - hexahydro - phenanthridine the sulfosalicylate of which melts at 210–211° C.

EXAMPLE 10

Treatment of 6,10b-dimethyl - 9 - methoxy-1,2,3,4,4a,5,6,10b-octahydrophenanthridine with formaldehyde and formic acid in a manner analogous to that described in Example 5 yields 5,6,10b-trimethyl-9-methoxy-1,2,3,4,4a,5,6,10b-octahydrophenanthridine. Melting point of the sulfosalicylate=245–246° C.; melting point of the hydrochloride 186–187° C.

EXAMPLE 11

In a manner analogous to Example 5, by treatment of 6,10b - dimethyl - 9-hydroxy-1,2,3,4,4a,5,6,10b-octahydrophenanthridine (manufactured according to Example 4) with formaldehyde and formic acid there is obtained 5,6,10b - trimethyl - 9-hydroxy-1,2,3,4,4a,5,6,10b-octahydrophenanthridine the hydrochloride of which melts at 250–251° C.

EXAMPLE 12

In a manner analogous to Example 3, by treatment of 5,6,10b - trimethyl - 9 - methoxy - 1,2,3,4,4a,5,6,10b-actahydro-phenanthridine (manufactured in accordance with Example 10) with hydrobormic acid there is obtained 5,6,10b - dimethyl - 9 - hydroxy - 1,2,3,4,4a,5,6,10b-octahyrdo-phenanthridine the hydrochloride of which melts at 250–251° C. This compound is identical with the compound manufactured according to Example 11.

EXAMPLE 13

In a manner analogous to Example 3, by treatment of 5,10b - dimethyl - 9 - methoxy - 1,2,3,4,4a,5,6,10b-octahydra-phenanthridine (manufactured according to Example 5) with hydrobromic acid, there is obtained 5,10b-dimethyl - 9 - hydroxy - 1,2,3,4,4a,5,6,10b - octahydrophenanthridine the hydrochloride of which melts at 289–290° C.

EXAMPLE 14

5,10b - dimethyl - 9 - hydroxy - 1,2,3,4,4a,5,6,10b-octahydro-phenanthridine can also be obtained by reaction of 9 - hydroxy - 10b - methyl - 1,2,3,4,4a,5,6,10b-octahydrophenanthridine (manufactured in accordance with Example 3) with formaldehyde and formic acid in analogy to Example 5.

EXAMPLE 15

By reaction of 6.8 g. of 2-methyl-2-(3'-hydroxyethyloxyphenyl)-cyclohexyl amine with 3.3 g. of formaldehyde, concentration of the reaction mixture, addition of 50 ml. of concentrated hydrochloric acid, evaporation and crystallisation from acetone, in analogy to Example 1, there is obtained 2.8 g. 9-hydroxyethyloxy-10b-methyl-1,2,3,4,4a,5,6,10b-octahydrophenanthridine melting at 136–137° C.

The 2 - methyl - 2 - (3' - hydroxyethyloxy - phenyl)-cyclohexyl amine used as starting material may be obtained as follows:

76.7 g. of 2-methyl-2-(3'-methoxy-phenyl)-cyclohexanone and 203 g. of pyridine-hydrochloride are heated together at 190° C. for six hours, whereby 57.8 g. of crude 2 - methyl - 2-(3'-hydroxy-phenyl)-cyclohexanone are obtained.

64.7 g. of this cyclohexanone compound, 59.4 g. of ethylene bromohydrine and 50 ml. of anhydrous ethanol are added to a solution of 7.3 g. of sodium in 250 ml. of anhydrous ethanol. There is obtained 72.5 g. of an oily substance which upon distillation at 164–165 C./0.2 mm., yields 56 g. of 2-methyl-2-(3'-hydroxyethoxy-phenyl)-cyclohexanone. This ketone is dissolved in 300 ml. of ethanol and the resulting solution, together with 23.5 g. of hydroxylamine, 25 ml. of water and 45 g. of sodium hydroxide, is heated at 40° C. for 30 minutes. The residue (62.5 g.) obtained upon concentration of the reaction mixture is crystallised from a mixture of acetone and petroleum ether, whereby 2-methyl-2-(3'-hydroxyethoxy-phenyl)-cyclohexanone oxime of melting point 108–109° C. is obtained.

2.6 g. of the above oxime are dissolved in 100 ml. of methanol, whereupon the resulting solution is treated with a solution of 0.56 g. of potassium hydroxide in 6 ml. of water. The reaction mixture is then hydrogenated at 40° C. using Raney-nickel as hydrogenation catalyst. The residue obtained upon removal of the catalyst by filtration and evaporation of the methanol present in the filtrate under reduced pressure is taken up in ether, the resulting ethereal solution being washed with water and evaporated to dryness, whereby 2 - methyl - 2 - (3'-hydroxyethoxy-phenyl)-cyclohexyl amine is obtained. The hydrochloric acid salt of this base melts at 251–252° C.

EXAMPLLE 16

22.2 g. 1-trimethylacetylamido-2-methyl-2-(3'-methoxy-phenyl)-cyclohexane are dissolved in 200 ml. of anhydrous benzene, whereupon the resulting solution is treated with 14.6 g. of phosphorus oxychloride and heated for three hours under reflux conditions. The reaction mixture is then concentrated by evaporation under reduced pressure, the resulting residue being extracted with ether and water. The aqueous extract is cooled with ice and made alkaline, whereupon the precipitated 6-tert.butyl-9 - methoxy - 10b-methyl-1,2,3,4,4a,10b-hexahydro-phenanthridine is taken up in ether. 9 g. of this base are obtained upon evaporation of the ether.

13.4 g. of 6-tert.butyl-9-methoxy-10b-methyl-1,2,3,4,4a-10b-hexahydro-phenanthridine are dissolved in 100 ml. of methanol, whereupon 5.4 g. of sodium borohydride are added portionwise at room temperature to the resulting solution which is then allowed to stand overnight. The 6-tert.butyl - 9-methoxy-10b-methyl-1,2,3,4,4a,5,6,10b-octahydro-phenantridine which precipitates on the addition of water is taken up in ether and washed with water. Concentration of the ethereal solution by evaporation yields 12.5 g. of the octahydro-phenanthridine base the hydrochloride of which melts at 238–239° C.

The 1 - trimethylacetylamido - 2-methyl-2-(3'-methoxy-phenyl)-cyclohexane used herein as starting material can be obtained as follows:

22 g. of 2-methyl-2-(3'-methoxy-phenyl)-cyclohexyl amine are dissolved in 200 ml. of chloroform, the resulting solution being treated first with 13.8 g. of potassium carbonate and then with pivalic acid chloride. The reaction mixture is then concentrated under reduced pressure, the residue taken up in ether and the ethereal solution washed successively with dilute hydrochloric acid, water, dilute aqueous potassium carbonate solution and once more with water. Upon evaporation of the ether, there is obtain 22.3 g. of 1-trimethylacetylamido-2-methyl-2-(3'-methoxy-phenyl)-cyclohexane, an oily substance.

EXAMPLE 17

6 g. of 6-tert.butyl-9-methoxy-10b-methyl-1,2,3,4,4a-5, 6,10b-octahydro-phenanthridine (obtained in accordance with Example 16) are treated with 30 ml. of formaldehyde solution and 30 ml. of 100% formic acid in a manner analogous to that described in Example 5, whereby 5.7 g. of crude 5,10-b-dimethyl-6-tert.butyl-9-methoxy-1, 2,3,4,4a,5,6,10b - octahydrophenanthridine are obtained. The oxalate obtained by treating this base with oxalic acid melts at 207–208° C.

EXAMPLE 18

By chromatography on silicagel of the mother liquors remaining in the preparation of 2-methyl-2-(3'-methoxy-phenyl)-cyclohexyl amine there is obtained an isomeric 2-methyl-2-(3'-methoxy-phenyl)-cyclohexyl amine with axial position of the hydrogen atom in position 1. The hydrochloride of this base melts at 216–217° C.

4.4 g. of this 2-methyl-2-(3'-methoxy-phenyl)-cyclohexyl amine (with axial position of the hydrogen atom in position 1) are dissolved in 2 ml. of methanol, whereupon 2 ml. of formaldehyde solution are added and the reaction mixture is heated at 60° C. for 30 minutes. Subsequent treatment of the reaction mixture with 10 ml. of dilute hydrochloric acid and evaporation yields 9-methoxy - 10b - methyl-1,2,3,4,4a,5,6,10b-octahydro-phenanthridine-hydrochloride (with axial position of the hydrogen atom in position 4a) having a melting point of 188–189° C. This compound is an isomer of the hydrochloride obtained in accordance with Example 1 and melting at 219–220° C.

EXAMPLE 19

(+)-1-formamido-2-methyl-2-(3'-methoxy-phenyl)-cyclohexane obtained by reaction of (+)-2-methyl-2-(3'-methoxy-phenyl)-cyclohexyl amine with formic acid in accordance with Example 9, is cyclised by means by phosphorus oxychloride in accordance with Example 9, whereby (—)-9-methoxy-10b-methyl-1,2,3,4,4a,10b-hexahydro-phenanthridine is obtained, the sulfosalicylate of which melts at 193–194° C.; $[\alpha]_D^{25} = -112.71°$ (c.=1.18 in methanol).

EXAMPLE 20

(—)-1-formamido-2-methyl-2-(3'-methoxy-phenyl)-cyclohexane obtained by reaction of (—)-2-methyl-2-(3'-methoxy-phenyl)-cyclohexyl amine with formic acid in accordance with Example 9, is cyclised by means of phosphorus oxychloride (in accordance with Example 9), whereby (+)-9-methoxy-10b-methyl-1,2,3,4,4a,10b-hexahydro-phenanthridine is obtained the sulfosalicylate of which melts at 192–193° C.; $[\alpha]_D^{25} = +112.7°$ (c.=1.01 in methanol).

EXAMPLE 21

9 - methoxy - 10b - cyclopropylmethyl - 1,2,3,4,4a,5,6, 10b-octahydro-phenanthridine-hydrochloride is prepared in analogy to Example 1. This compound melts at 157–159° C.

EXAMPLE 22

9 - methoxy - 10b - ethyl - 1,2,3,4,4a,5,6,10b - octahydro - phenanthridine - hydrochloride of melting point 231–232° C. is obtained in analogy to Example 1. Working up of the mother liquors yields an isomer melting at 190–194° C.

EXAMPLE 23

A solution of 12 g. of (+)-2-methyl-2-(3'-methoxy-phenyl)-cyclohexyl amine in 20 ml. methanol is treated with 6 ml. of a 38% aqueous formaldehyde solution, the reaction mixture being allowed to stand at room temperature over night. The mixture is then concentrated by evaporation under reduced pressure, the remaining water being distilled off azeotropically with ethanol. The resulting (—)-5,5'-methylene-bis-(9 - methoxy - 10b - methyl-1,2,3,4,4a,5,6,10b-octahydro-phenanthridine) has a melting point of 190–192° C.; $[\alpha]_D^{25} = -50.6°$ (c.=1% in methanol).

This bis-compound can be cleaved by treatment with ethanolic hydrochloric acid, whereby (—)-9-methoxy-10b - methyl - 1,2,3,4a,5,6,10b - octahydro-phenanthridine-hydrochloride is obtained.

EXAMPLE 24

Tablets of the following composition are prepared:

| | Mg. |
|---|---|
| (—) - 9 - methoxy - 10b - methyl - 1,2,3,4,4a,5,6, 10b - octahydro - phenanthridine - hydrochloride | 23.15 |
| Lactose | 80.85 |
| Corn starch | 43.00 |
| Magnesium stearate | 0.30 |
| Talc | 2.70 |
| | 150.00 |

What is claimed is:
1. A phenanthridine derivative of the formula

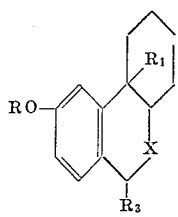

wherein $R_1$ is a member selected from the group consisting of lower alkyl, lower cycloalkyl of 3–5 carbon atoms-substituted lower alkyl of 1–4 carbon atoms and lower alkenyl; $R_3$ is a member selected from the group consisting of hydrogen and lower alkyl; R is a member selected from the group consisting of hydrogen, lower alkyl, and hydroxy-substituted lower alkyl; and X represents a grouping selected from

and

$R_2'$ being a member selected from the group consisting of hydrogen, lower alkyl, and a radical of the formula

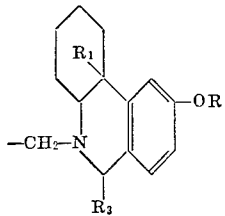

wherein R, $R_1$ and $R_3$ have the above meaning;
and pharmaceutically acceptable salts thereof.

2. A hexahydrophenanthridine derivative of the formula

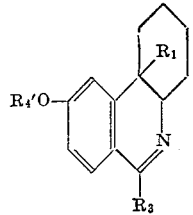 (IIIa)

wherein $R_1$ is a member selected from the group consisting of lower alkyl, lower cycloalkyl of 3–5 carbon atoms- substituted lower alkyl of 1–4 carbon atoms and lower alkenyl; $R_3$ is a member selected from the group consisting of hydrogen, and lower alkyl; and $R_4'$ is a member selected from the group consisting of hydrogen, lower alkyl, and hydroxy-substituted lower alkyl;
and pharmaceutically acceptable quaternary salts thereof.

3. A hexahydrophenanthridine derivative as claimed in claim 2, wherein $R_1$ and $R_4'$ are methyl groups and $R_3$ is hydrogen.

4. (−) - 9 - methoxy - 10b - methyl - 1,2,3,4,4a,10b-hexahydrophenanthridine and pharmaceutically acceptable quaternary salts thereof.

5. An octahydrophenanthridine derivative of the formula

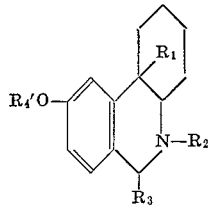 (IV)

wherein $R_1$ is a member selected from the group consisting of lower alkyl, lower cycloalkyl of 3–5 carbon atoms-substituted lower alkyl of 1–4 carbon atoms and lower alkenyl; $R_2$ and $R_3$ each represent a member selected from the group consisting of hydrogen, and lower alkyl; and $R_4'$ is a member selected from the group consisting of hydrogen, lower alkyl, and hydroxy-substituted lower alkyl;
and pharmaceutically acceptable acid addition salts thereof.

6. An octahydrophenanthridine derivative as claimed in claim 5, wherein $R_1$ and $R_4'$ are methyl groups and $R_2$ and $R_3$ hydrogen atoms.

7. (−) - 9 - methoxy - 10b - methyl - 1,2,3,4,4a,5,6,10b-octahydro-phenanthridine and pharmaceutically acceptable acid addition salts thereof.

References Cited

UNITED STATES PATENTS 3,243,438    3/1966    Hellerbach et al. ____ 260—289

ALEX MAZEL, Primary Examiner
ANNE MARIE T. TIGHE, Assistant Examiner

U.S. Cl. X.R.

260—288, 289, 557, 562, 566, 571, 573, 590, 612; 424—258